United States Patent
Tomaru

(10) Patent No.: US 9,952,830 B2
(45) Date of Patent: Apr. 24, 2018

(54) DISCRETE COMPUTATION COMPUTER AND COMPUTATION PROGRAM

(71) Applicant: Hitachi, Ltd., Tokyo (JP)

(72) Inventor: Tatsuya Tomaru, Tokyo (JP)

(73) Assignee: Hitachi, Ltd., Tokyo (JP)

( * ) Notice: Subject to any disclaimer, the term of this patent is extended or adjusted under 35 U.S.C. 154(b) by 0 days.

(21) Appl. No.: 15/108,905

(22) PCT Filed: Feb. 6, 2014

(86) PCT No.: PCT/JP2014/052763
§ 371 (c)(1),
(2) Date: Jun. 29, 2016

(87) PCT Pub. No.: WO2015/118639
PCT Pub. Date: Aug. 13, 2015

(65) Prior Publication Data
US 2016/0328208 A1    Nov. 10, 2016

(51) Int. Cl.
*G06F 7/548* (2006.01)
*G06N 99/00* (2010.01)

(52) U.S. Cl.
CPC ........... *G06F 7/548* (2013.01); *G06N 99/002* (2013.01)

(58) Field of Classification Search
None
See application file for complete search history.

(56) References Cited

U.S. PATENT DOCUMENTS

2010/0306142 A1    12/2010 Amin

FOREIGN PATENT DOCUMENTS

JP    2009-524857 A    7/2009

OTHER PUBLICATIONS

Edward Farhi, et al., "A quantum Adiabatic Evolution Algorithm Applied to Random Instances of an NP-complete Problem," Science 292, 472 (2001).

(Continued)

*Primary Examiner* — Michael D. Yaary
(74) *Attorney, Agent, or Firm* — Mattingly & Malur, PC

(57) ABSTRACT

A classical technique relying on thermodynamics is used, and spin $s_j$, which is a variable, is made to follow a local effective magnetic field $B_j$ to bring a system to a ground state of a problem-setting system. The ground state is a solution thereof. At t=0, the effective magnetic field $B_j$ is applied rightward in all the sites, and all the spins $s_j$ are initialized rightward. The magnetic field in the z axis direction and the interaction between spins are gradually applied with time t, which finally brings the spins in the +z direction or the −z direction, and the z components of the spins $s_j$ become $s_j^z=+1$ or −1. In addition, correction parameters originating from quantum mechanical effects are introduced when the direction of the spin $s_j$ is made to follow the direction of the effective magnetic field $B_j$ so as to improve calculation performance.

15 Claims, 8 Drawing Sheets

(56) References Cited

OTHER PUBLICATIONS

Alejandro Perdomo-Ortiz, el al., "Finding low-energy conformations of lattice protein models by quantum annealing," Scientific Reports 2, 571 (2012).
Francisco Barahona, "On the computational complexity of Ising spin glass models," J. Phys. A: Math. Gen. 15, 3241 (1982).
International Search Report of PCT/JP2014/052763 dated Apr. 22, 2014.

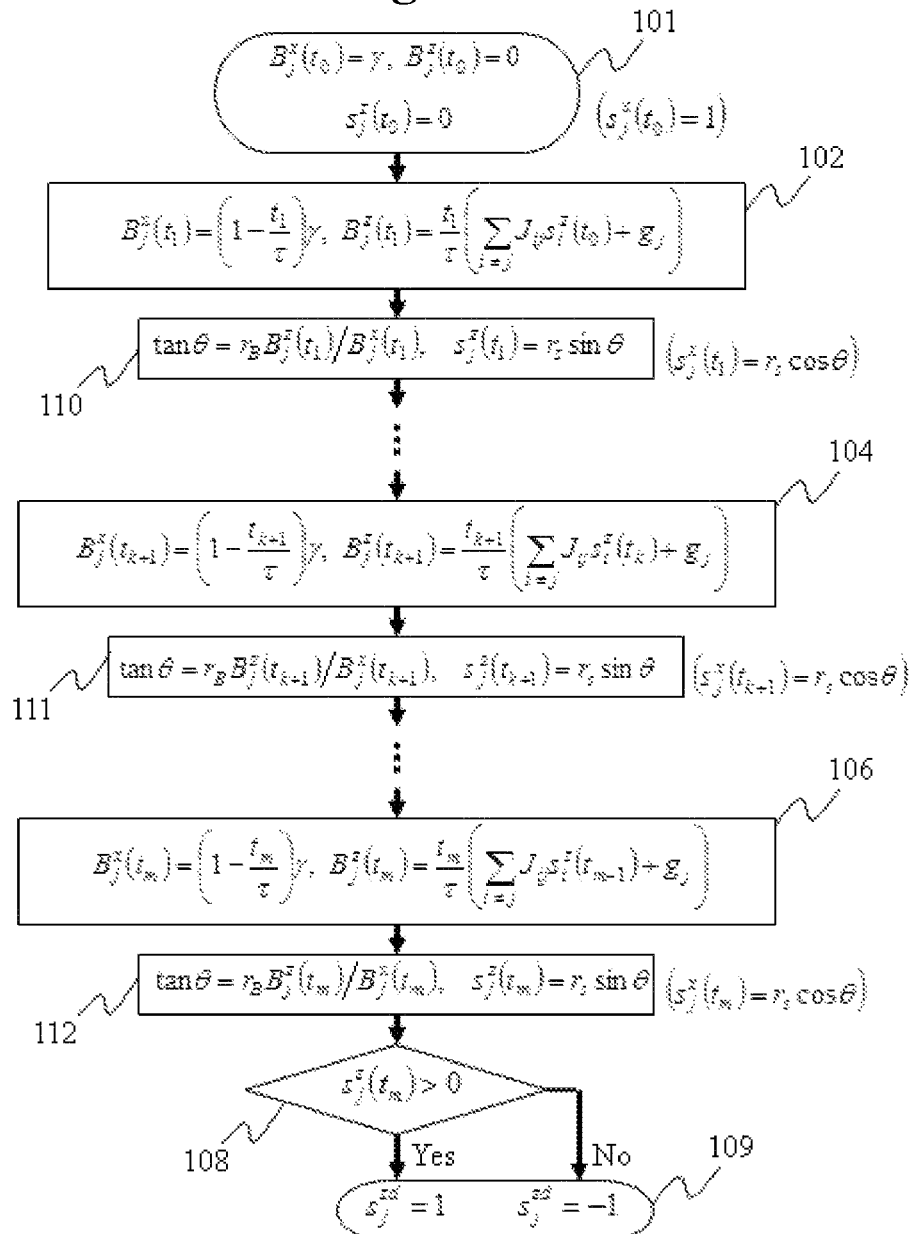

DISCRETE COMPUTATION COMPUTER AND COMPUTATION PROGRAM

TECHNICAL FIELD

The present invention relates to a computer that enables fast computation of such inverse problems that require exhaustive search.

BACKGROUND ART

Today, as represented by such a term as big data, there is a flood of data. How to analyze and handle the huge amounts of data is a social scientific problem of the highest importance in future information science. Big data typically result from some phenomena. Thus, analysis of big data often corresponds to a certain type of inverse problem for searching a cause from a result. A computer is configured to routinely perform regular processing, and simply performs calculation on the basis of an algorithm when an initial value is given. In general, however, there is no efficient algorithm for such a problem of obtaining an initial value from a result, and an exhaustive search has to be conducted for finding the initial value in the worst case. A computer capable of efficiently solving a problem that requires an exhaustive search would therefore be very useful.

Quantum computers are highly expected to be suitable for exhaustive search problems. A quantum computer is constituted by basic elements called qubits, which can be "0" and "1" at the same time. Computation using all candidates of a solution simultaneously as initial values is thus possible, which provides just the possibility for an exhaustive search. However, a quantum computer needs to maintain quantum coherence over the entire computation time, but there are no prospects therefor.

A technique called adiabatic quantum computing (AQC) has been drawing attention under such circumstances (NPL 1). This method consists of setting a Hamiltonian $\hat{H}_p$ so that the solution of a problem is a ground state of a system, setting another Hamiltonian $\hat{H}_0$ whose ground state is clarified and readily provided, preparing the ground state of $\hat{H}_0$ in a computation system first, and changing Hamiltonian $\hat{H}_0$ to Hamiltonian $\hat{H}_p$ spending sufficiently long time. A sufficiently slow change allows the system to keep staying in its ground state, which is the principle how to obtain a solution in the adiabatic quantum computing. The computation principle as described above can be described by the Schrodinger equation of Eq. (1) using the Hamiltonian of Eq. (2) where the computation time is represented by $\tau$.

$$i\hbar \frac{\partial}{\partial t}|\psi(t)\rangle = \hat{H}(t)|\psi(t)\rangle \quad \text{[Eq. 1]}$$

$$\hat{H}(t) = \left(1 - \frac{t}{\tau}\right)\hat{H}_0 + \frac{t}{\tau}\hat{H}_p \quad \text{[Eq. 2]}$$

The adiabatic quantum computing is also applicable to problems requiring an exhaustive search, and reaches a solution through a one-way process. If, however, a computational process needs to obey the Schrodinger equation of Eq. (1), the quantum coherence needs to be maintained as similar to quantum computing. Note, however, that the adiabatic quantum computing makes the whole qubit system interact at the same time while quantum computing repeats gate operation on one qubit or between two qubits, and the difference leads to different concepts of coherence. Let us assume a gate operation on a qubit, for example. If there is interaction between this qubit and another qubit in the operation, this will be a cause of decoherence; however, in the adiabatic quantum computing, since all qubits are made to interact at the same time, the case of this example does not correspond to decoherence. In light of this difference, the adiabatic quantum computing is considered to be more robust against decoherence than quantum computing is.

The adiabatic quantum computing, however, also has disadvantages. Even with higher robustness against decoherence than quantum computing, sufficient coherence is still required if the computation process obeys the Schrodinger equation of Eq. (1). In addition, the fact that the system that can achieve the adiabatic quantum computing is a superconducting magnetic flux qubit system is also a disadvantage (PTL 1, NPL 2). This is because use of superconducting requires cryogenic cooling equipment. The requirement of very low temperature is disadvantageous in achieving a practical computer.

CITATION LIST

Patent Literature

PTL 1: Japanese Translation of PCT international Application Publication No. 2009-524857

Non-Patent Literatures

NPL 1: E. Farhi, et al., "A quantum adiabatic evolution algorithm applied to random instances of an NP-complete problem," Science 292, 472 (2001).

NPL 2: A. P.-Ortiz, "Finding low-energy conformations of lattice protein models by quantum annealing," Scientific Reports 2, 571 (2012).

NPL 3: F. Barahona, "On the computational complexity of Ising spin glass models," J. Phys. A: Math. Gen. 15, 3241 (1982).

SUMMARY OF INVENTION

Technical Problem

As described above, the adiabatic quantum computing is effective for such difficult problems that require an exhaustive search, but still requires quantum coherence, and also requires cryogenic cooling equipment when superconducting magnetic flux qubits are used. A real problem to be solved is to eliminate these two requirements and provide a practical computer.

An object of the invention is to solve the aforementioned problems, and is to provide a computer that does not require quantum coherence and cryogenic cooling equipment and to provide a computation program.

Solution to Problem

One aspect of the invention for solving the aforementioned problems provides a computer including: a computing unit; a storage unit; and a control unit, the computer being configured to perform computation while exchanging data between the storage unit and the computing unit under control of the control unit, wherein N variables $s_j$ ($j=1, 2, \ldots, N$) have a range of $-1 \leq s_j \leq 1$, a program is set through setting local field $g_j$ and interaction $J_{ij}$ between variables (i, j=1, 2, \ldots, N), and $s_j = -1$ or 1 is a final solution, time axis is divided into m parts and computation is performed discretely from $t=t_0$ ($t_0=0$) to $t_m$, an initial value is set to $s_j(t_0)=0$ at $t=t_0$ and a value of variable $s_j(t_k)$ at each time $t_k$ is determined using $B_j(t_k)=(\Sigma_i J_{ij} s_i(t_{k-1})+g_j)t_k/t_m$, and a function f is defined to give $s_j(t_k)=f(B_j(t_k))$ so that $s_j(t_k)$ has a range of $-1 \leq s_j(t_k) \leq 1$, $t_k$), and $s_j$ is made closer to $-1$ or $1$ as a time step is taken forward from $t=t_0$ to $t=t_m$, and finally $s_j=-1$ is determined as a solution if $s_j<0$ or $s_j=1$ is determined as the solution if $s_j>0$.

Another aspect of the invention for solving the aforementioned problems provides a computer including: a computing unit; a storage unit; and a control unit, the computer being configured to perform computation while exchanging data between the storage unit and the computing unit under control of the control unit, wherein N vector variables $s_j$ (j=1, 2, ..., N, $|s_j|=1$) are used, a program is set through setting local field $g_j$ and interaction $J_{ij}$ between variables (i, j=1, 2, ..., N), and the z component of $s_j$ is a final solution as $s_j^z=-1$ or 1, and time axis is divided into m parts and computation is performed discretely from $t=t_0$ ($t_0=0$) to $t_m$, the x component of $s_j$ has an initial value of $s_j^x(t_0)=1$, the z component thereof is $s_j^z(t_0)=0$, a value of variable $s_j^z(t_k)$ at each time $t_k$ is determined using $B_j^x(t_k)=\gamma(1-t_k/t_m)$ and $B_j^z(t_k)=(\Sigma_i J_{ij} s_i^z(t_{k-1})+g_j)t_k/t_m$ or using $B_j^x(t_k)=\gamma$ and $B_j^z(t_k)=(\Sigma_i J_{ij} s_i^z(t_{k-1})+g_j)t_k/t_m$, $\gamma$ being a constant, functions $f_1$ and $f_2$ are defined to give $s_j^z(t_k)=f_1(B_j^x(t_k), B_j^z(t_k))$, $s_j^x(t_k)=f_2(B_j^x(t_k), B_j^z(t_k))$ so that a vector variable $s_j(t_k)$ becomes $|s_j(t_k)|=1$ or $|s_j(t_k)|<1$, $s_j^z$ is made closer to $-1$ or $1$ as a time step is taken forward from $t=t_0$ to $t=t_m$, and finally $s_j^{zd}=-1$ is determined as a solution if $s_j^z<0$ or $s_j^{zd}=1$ is determined as the solution if $s_j^z>0$.

Still another aspect of the present invention for solving the aforementioned problems provides a computation program to be executed by a computing unit, wherein N variables $s_j$ (j=1, 2, ..., N) have a range of $-1 \leq s_j \leq 1$, a problem is set through setting local field $g_j$ and interaction $J_{ij}$ between variables (i, j=1, 2, ..., N), and $s_j=-1$ or $1$ is a final solution, time axis is divided into m parts and computation is performed discretely from $t=t_0$ ($t_0=0$) to $t_m$, an initial value is set to $s_j(t_0)=0$ at $t=t_0$, and a value of variable $s_j(t_k)$ at each time $t_k$ is determined using $B_j(t_k)=(\Sigma_i J_{ij} s_i(t_{k-1})+g_j)t_k/t_m$, and a function f is defined to give $s_j(t_k)=f(B_j(t_k), t_k)$ so that $s_j(t_k)$ has a range of $-1 \leq s_j(t_k) \leq 1$, and $s_j$ is made closer to $-1$ or $1$ as a time step is taken forward from $t=t_0$ to $t=t_m$, and finally $s_j=-1$ is determined as a solution if $s_j<0$ and $s_j=1$ is determined as the solution if $s_j>0$.

Advantageous Effects of Invention

According to the above solution, a classical system can also be used as a computation system, where quantum coherence does not need to be considered and the range of available resources becomes wider. When the energy scale of bits is sufficiently greater than the energy scale of temperature, the temperature can be assumed to be absolute zero in a pseudo manner, which eliminates the need for special equipment and special environment such as cryogenic equipment.

BRIEF DESCRIPTION OF DRAWINGS

FIG. 3 illustrates an example of a flowchart of an algorithm according to the second embodiment.

DESCRIPTION OF EMBODIMENTS

Figure 1:
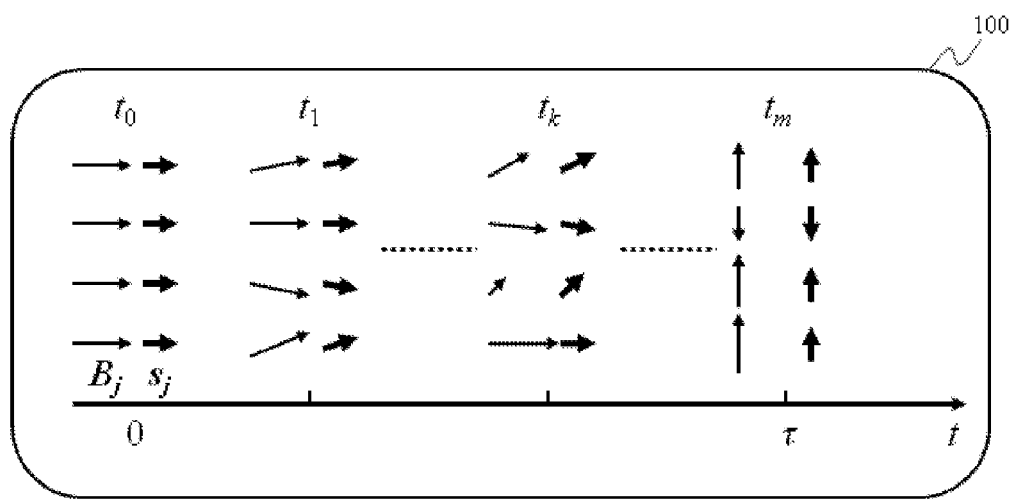
FIG. 1 is a schematic diagram explaining an algorithm, which is the principle of the present invention.

Various embodiments are hereinafter described with reference to the drawings and also with reference to the principle of computation in the present invention.

At absolute zero, a ground state is a thermal equilibrium state. A thermal equilibrium state can thermodynamically change to another thermal equilibrium state through a quasistatic process. The change from a ground state to another ground state at absolute zero is thus a process permitted not only in a quantum system but also in a classical system. A computer is thus operated according to a classical algorithm to bring the ground state of a Hamiltonian to the ground state of another Hamiltonian reflecting a problem through a quasistatic process (an adiabatic process). In the present invention, the quasistatic process is achieved in a spin system, where a spin variable responds to a local effective magnetic field. While the spin and the effective magnetic field in the present invention are classical quantities, correction parameters originating from quantum mechanical effects are introduced to determine the direction of the spin that responds to the effective magnetic field so as to improve the performance of computation. Note that a quasistatic process in thermodynamics is conventionally called an adiabatic process in dynamical systems. The terms "quasistatic" and "adiabatic" are synonymous herein.

As described above, a quasistatic process from a ground state to another ground state is also possible in the classical system at absolute zero. The following embodiments describe a classical algorithm for obtaining a ground state as a solution on the basis of this property and a device for implementing the algorithm.

First Embodiment

The first embodiment describes the principle of the present invention, starting with a quantum mechanical description and moving to a classical form. A quantum system described by the Schrodinger equation includes no parameters related to temperature, and its state is called a pure state. In other words, in terms of temperature, the Schrodinger equation describes a state at absolute zero. Thus, the following description will be basically those at absolute zero.

Searching the ground state of the Ising spin Hamiltonian given by Eq. (3) is categorized into an NP-hard problem and is known to be a useful problem (NPL 3).

$$\hat{H}_p = -\sum_{i>j} J_{ij}\hat{\sigma}_i^z\hat{\sigma}_j^z - \sum_j g_j\hat{\sigma}_j^z \quad [\text{Eq. 3}]$$

$J_{ij}$ and $g_j$ are parameters for setting problems, and $\hat{\sigma}_j^z$ is the z component of the Pauli spin matrix and has eigenvalues of ±1. i and j represent sites of spins. An Ising spin means a variable that can have only a value of ±1. Equation (3) expresses an Ising spin system since the eigenvalue of $\hat{\sigma}_j^z$ is ±1. Ising spins in Eq. (3) do not need to be literally spins but may be other physical variables as long as the Hamiltonian is described with Eq. (3). For example, the polarization of light may be it, where vertical polarization and horizontal polarization may be associated with ±1, respectively. Alternatively, the phase of light may be used as will be described in the seventh embodiment. In adiabatic computing in the present embodiment, a computation system is provided in the ground state of the Hamiltonian given by Eq. (4) at time t=0 as similar to the adiabatic quantum computing.

$$\hat{H}_0 = -\gamma\sum_j \hat{\sigma}_j^x \quad [\text{Eq. 4}]$$

γ is a proportionality constant determined by the magnitude of an external field applied uniformly to all the sites j, and $\hat{\sigma}_j^x$ is the x component of the Pauli spin matrix. If the computation system consists of spins, the external field means a magnetic field. Equation (4) corresponds to a transverse magnetic field applied, and when all spins are directed in the x direction (γ>0), the state stays in the ground state. Although the problem Hamiltonian is defined by assuming an Ising spin system that includes only the z components, the x components of spins appear in Eq. (4). Thus, the spins during the computation process are not Ising but vectorial (Bloch vector). The Hamiltonian at t=0 is given by Eq. (4). It gradually changes with time t and finally becomes the Hamiltonian described by Eq. (3), whose ground state is the solution.

First, let us examine how a spin will respond to an external field in case of a one-spin system. A Hamiltonian of the one-spin system is given by Eq. (5).

$$\hat{H} = -B\cdot\hat{\sigma} \quad [\text{Eq. 5}]$$

Here, vector $\hat{\sigma}$ denotes three components of the Pauli spin matrices. The spin is directed along the magnetic field direction in the ground state. The quantum mechanical expectation value of the spin is expressed by $\langle\hat{\sigma}\rangle = B/|B|$. Since a ground state keeps staying in its state through an adiabatic process, the direction of a spin always follows the magnetic field direction.

The discussion above can also be extended to a multiple-spin system. At t=0, the Hamiltonian is given by Eq. (4). This means that the magnetic field $B_j^x = \gamma$ is uniformly applied to all the spins. At t>0, the x component of the magnetic field gradually weakens according to $B_j^x = \gamma(1-t/\tau)$. Regarding the z component, the effective magnetic field is expressed by Eq. (6) based on the interaction between spins.

$$\hat{B}_j^z(t) = \frac{t}{\tau}\left(\sum_{i=j} J_{ij}\hat{\sigma}_i^z + g_j\right) \quad [\text{Eq. 6}]$$

Since the direction of spins can be defined as $\langle\hat{\sigma}_j^z\rangle/\langle\hat{\sigma}_j^x\rangle$, if the direction of spins follows that of the magnetic field, it is determined by Eq. (7). In other words, computation is achieved in a manner that spins, which are variables, are made to follow the local effective magnetic field.

$$\langle\hat{\sigma}_j^z\rangle/\langle\hat{\sigma}_j^x\rangle = \langle\hat{B}_j^z(t)\rangle/\langle\hat{B}_j^x(t)\rangle \quad [\text{Eq. 7}]$$

Equation (7) is a quantum mechanical description. However, since expectation values are taken, the quantities in Eq. (7) are classical quantities unlike in Eqs. (1) to (6).

On the basis of the above-described principle, a spin system can be brought to the ground state of a problem Hamiltonian through a procedure 100 shown in a timing chart of FIG. 1. Since the description of FIG. 1 relates to classical quantities, spin $\hat{\sigma}_j$ of site j is replaced by $s_j$. The effective magnetic field $B_j$ in FIG. 1 is similarly a classical quantity. At t=0, the effective magnetic field $B_j$ is applied rightward in all the sites, and all the spins $s_j$ are initialized rightward. The magnetic field in the z axis direction and the interaction between spins are gradually applied with an increase in time t, which finally brings the spins into the +z direction or the −z direction, and the z components of the spins $s_j$ become $s_j^z = +1$ or −1. Note that the time t is ideally continuous, but is discrete in an actual computation process so as to increase convenience.

Since the spins according to the present invention also have x components in addition to z components, the spins are vectorial spins. Vectorial behaviors can also be understood from FIG. 1. The reason why y components have not been mentioned so far is that the external field has no y components because the external field direction is defined in the xz plane, and thus $\langle\hat{\sigma}^y\rangle = 0$ is satisfied. Spins in the computation system are assumed to be a three-dimensional vector having a magnitude of 1 (which is called Bloch vector and capable of describing a state using a point on a sphere), but only two dimensions are needed according to the definition of the coordinate axes (a state can be described by a point on a circle). In addition, since γ is constant, $B_j^x(t)>0$ (γ>0) or $B_j^x(t)<0$ (γ<0) is satisfied. In this case, a two-dimensional spin vector can be described only in a hemisphere, and the two-dimensional spin vector can be designated with one-component variable of $s_j^z$ by specifying $s_j^z$ to be [−1, 1]. A spin in the present invention can thus be expressed as a two-dimensional vector and can also be expressed as a one-dimensional continuous variable with a range of [−1, 1].

In the procedure 100 of FIG. 1, the effective magnetic field at $t=t_k$ is first determined at each site, and the directions of the spins at $t=t_k$ are determined by Eq. (8) using the field values.

$$s_j^z(t_k)/s_j^x(t_k) = B_j^z(t_k)/B_j^x(t_k) \quad [\text{Eq. 8}]$$

Since Eq. (8) is rewritten from Eq. (7) to make a classical form, Eq. (8) contains no symbol $\langle\cdot\rangle$.

Next, the effective magnetic fields at $t=t_{k+1}$ are determined using the values of the spins at $t=t_k$. The effective magnetic fields at each time are concretely described by Eqs. (9) and (10).

$$B_j^x(t_{k+1}) = \left(1 - \frac{t_{k+1}}{\tau}\right)\gamma \quad [\text{Eq. 9}]$$

-continued $$B_j^z(t_{k+1}) = \frac{t_{k+1}}{\tau}\left(\sum_{i=j} J_{ij} s_i^z(t_k) + g_j\right)$$ [Eq. 10]

Hereinafter, the spins and the effective magnetic fields are alternately determined according to the procedure schematically shown as procedure 100 in FIG. 1.

In the process of obtaining the x and z components of each spin on the basis of Eq. (8), the magnitude of a spin vector is assumed to be 1. θ is obtained from tan $\theta = B_j^z(t_k)/B_j^x(t_k)$, and $s_j^z(t_k) = \sin\theta$ and $s_j^x(t_k) = \cos\theta$ are obtained. Since these are functions for obtaining $s_j^z$ and $s_j^x$ from $B_j^z(t_k)$ and $B_j^x(t_k)$ through θ, the functions can also be expressed as $s_j^z(t_k) = f_1(B_j^z(t_k), B_j^x(t_k))$ and $s_j^x = f_2(B_j^z(t_k), B_j^x(t_k))$, respectively. The ranges of $f_1$ and $f_2$ are [−1, 1]. Specific description is $f_1(B_j^z(t_k), B_j^x(t_k)) = \sin(\arctan(B_j^z(t_k)/B_j^x(t_k)))$.

Use of Eq. (9) in $B_j^x(t_k)$ results in tan $\theta = B_j^z(t_k)/\{\gamma(1-t_k/t_m)\}$, and the function $f_1$ is then described as $f_1(B_j^z(t_k), B_j^x(t_k)) = s_j^z(t_k) = \sin(\arctan(B_j^z(t_k)/\{\gamma(1-t_k/t_m)\})) \equiv f(B_j^z(t_k), t_k)$. Thus, $s_j^z(t_k)$ can be obtained with only the values of $B_j^z(t_k)$ and $t_k$. The x component of the effective magnetic field and the x components of the spins, that is, $B_j^x(t_k)$ and $s_j^x(t_k)$ thus do not need to be obtained. This simplicity simplifies computation devices and increases computation speed. Let a final solution be $s_j^{zd}$, which needs to be $s_j^{zd} = -1$ or 1. The solution is $s_j^{zd} = 1$ if $s_j^z(\tau) > 0$, and $s_j^{zd} = -1$ if $s_j^z(\tau) < 0$.

In the adiabatic computation technique, it is assumed that the external field in the x axis direction is reduced with time and disappears at t=τ. However, if $|B_j^z(\tau)| \gg |B_j^x(\tau)|$ is satisfied at t=τ, the procedure 100 in FIG. 1 may be processed while $B_j^x(t_k)$ is kept constant. In this case, further simplification is possible, and a simplified computation is obtained like $f_1(B_j^z(t_k), B_j^x(t_k)) = s_j^z(t_k) = \sin(\arctan(B_j^z(t_k)/\gamma)) \equiv f(B_j^z(t_k))$.

In summary of the above, if tan $\theta = B_j^z(t_k)/\{\gamma(1-t_k/t_m)\}$ or tan $\theta = B_j^z(t_k)/\gamma$. function $f_1$ can be described as $f_1(B_j^z(t_k), B_j^x(t_k)) = f(B_j^z(t_k), t_k) = \sin(\arctan(B_j^z(t_k)/\{\gamma(1-t_k/t_m)\}))$ or $f_1(B_j^z(t_k), B_j^x(t_k)) = f(B_j^z(t_k)) = \sin(\arctan(B_j^z(t_k)/\gamma))$.

Figure 2:
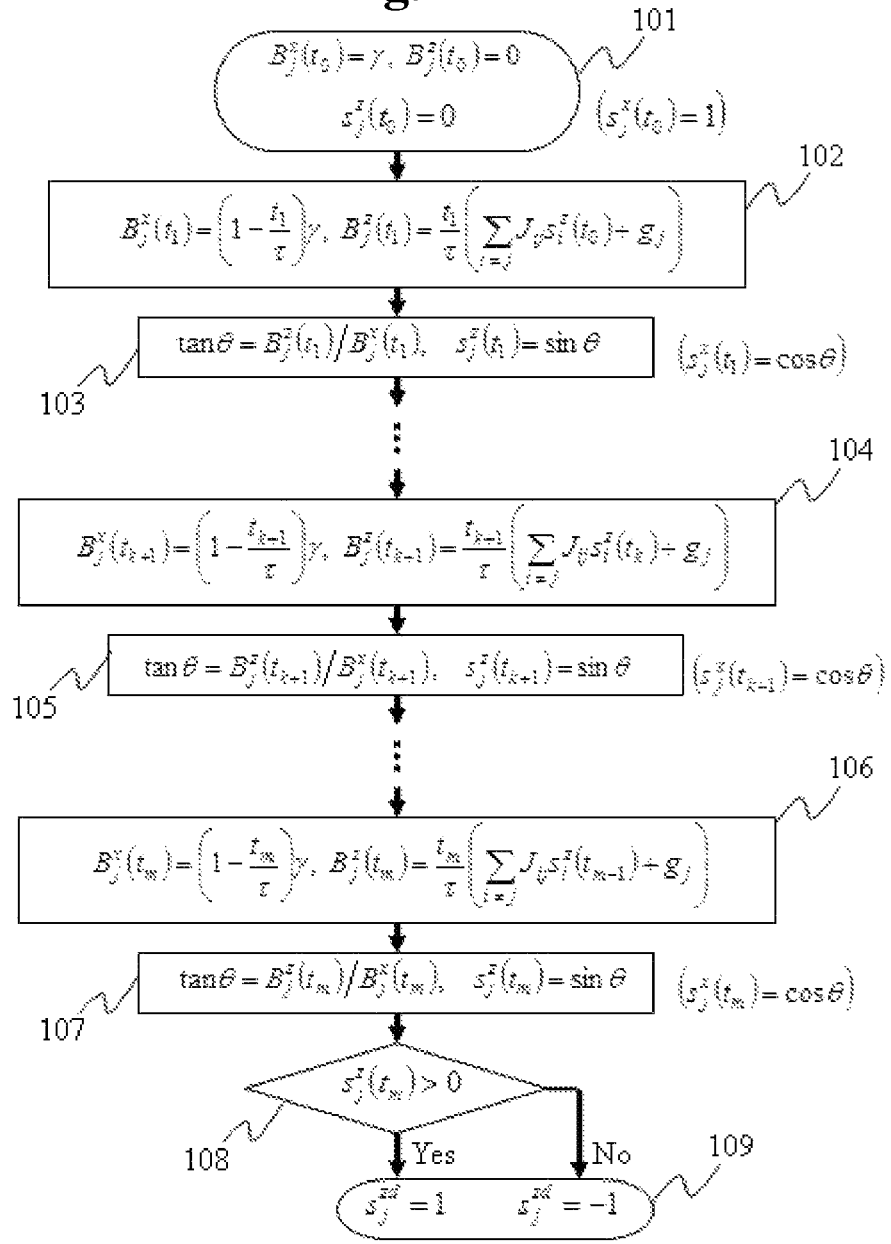
FIG. 2 illustrates an example of a flowchart of an algorithm according to the first embodiment.

FIG. 2 illustrates the flowchart of the algorithm of the first embodiment described above, where $t_m = \tau$. Sequential steps 101 to 109 in the flowchart in FIG. 2 correspond to processes from time t=0 to time t=τ in the procedure 100 in FIG. 1. Specifically, steps 102, 104, and 106 of the flowchart respectively correspond to Eqs. (9) and (10) at $t=t_1$, $t_{k+1}$, and $t_m$. The solution is obtained to be $s_j = -1$ if $s_j < 0$ and $s_j = 1$ if $s_j > 0$ (109) in the final step 108.

In the present embodiment, it has been described so far how the problem described by Eq. (3) is solved. Next, let us describe a specific example on how a specific problem is expressed by Eq. (3) with local field $g_j$ and interaction $J_{ij}$ between variables (i, j=1, 2, . . . , N). For example, let us consider a problem of power supply control as a specific problem. In this case, the local field denotes a quantity of natural phenomenon such as temperature or power consumption. Specifically, it is assumed that local field $g_j$ (j=1 to 10) denotes the temperature of each area, local field $g_j$ (j=11 to 20) denotes power consumption at a public facility (a library, a cinema, a supermarket, etc.) located in each area, and local field $g_j$ (j=21 to 100) denotes power consumption at each house.

$\hat{\sigma}_j^z$ (j=11 to 100) is assumed to be a variable expressing where to distribute power. Since j=1 to 10 is a suffix denoting temperature, $\hat{\sigma}_j^z$ (j=1 to 10) does not express power distribution but is a variable for making the temperature affect the activity of each public facility or house. Since temperature is determined by natural phenomena and should be affected little by man-caused factors, local field $g_j$ (j=1 to 10) is set to a large value so that $\hat{\sigma}_j^z$ (j=1 to 10) will not be affected by other variables.

The correlation strength between temperature and the activity of a public facility or a house is expressed through the interaction $J_{ij}$ between variables. The correlation between temperature and power consumption is also affected by the concept of power sharing suggested in recent years. An example thereof is an attempt of reducing power consumption at homes by going to public facilities instead of using air conditioners at homes during the time when air conditioning is needed. Such attempt is expressed in such a manner that the interaction $J_{ij}$ between variables of a suffix i=11 to 20 denoting a public facility and a suffix j=21 to 100 denoting a house is set to a value other than zero. However, since the interaction based on this concept is smaller than the direct correlation between the temperature and the activity at a house, the value of the interaction $J_{ij}$ between variables here is relatively small. Furthermore, since people in respective houses do not live their lives independent of other houses but houses should affect one another, the interaction $J_{ij}$ (i, j=21 to 100) between variables is finite. Through such examination as described above, the interaction $J_{ij}$ between variables is specifically set, and an optimum power supply distribution (eigenvalue of $\hat{\sigma}_j^z = +1$ or −1) is obtained through the ground state search of Eq. (3).

If $\hat{\sigma}_j^z$ for each item cannot be expressed by one variable, multiple spins $\hat{\sigma}_j^z$ may be used, and then multiple local fields $g_j$ and interactions $J_{ij}$ between variables are also used for each item accordingly. $\hat{\sigma}_j^z$ is a variable expressing power distribution, which is correlated with activities of people and an open/close status of a public facility. This may result in such an interpretation that "a public facility should be closed" depending on the obtained solution.

The above is a simple example of how a specific problem is described with Eq. (3). Specific problems to which the present embodiment can be applied are not limited to problems of power supply control as presented above, but the present embodiment is applicable to a variety of problems solving such as travel route optimization, circuit design, product supply control, scheduling, and financial asset selection.

Second Embodiment

The first embodiment started with a quantum mechanical treatment, and the quantum-mechanical quantity was transferred to a classical one by taking the expectation value. The algorithm was explained using the classical quantities with reference to FIGS. 1 and 2. While the algorithm of the first embodiment is classical on the basis of the thermodynamic property of the quasistatic process, a quantum mechanical effect can be added to improve performance such as accuracy and computation speed. Thus, the second embodiment describes an embodiment in which an algorithm itself is classical but a correction parameter based on quantum mechanics is added to improve the performance.

Quantum mechanics has the characteristics of linear superposition and quantum entanglement. For example, let us assume a qubit that can take two states of |0> and |1>. The linear superposition means that a state is expressed with a sum like $|\Psi\rangle = \alpha|0\rangle + \beta|1\rangle$. This property of linear superposition is already included in the present invention. A spin treated as a vector in the first embodiment corresponds to it. Specifically, if $s_j^z(t_k) = 1$, the state is |0>, and if $s_j^z(t_k) = -1$, the state is |1>. Expressions |0> and |1> correspond to the case where the quantization axis is selected to be the z axis. When the quantization axis is along the x-axis, the state is described by $|\Psi(t_0)\rangle=(|0\rangle+|1\rangle)/\sqrt{2}$ if $s_j^x(t_0)=1$ and by $|\Psi(t_0)\rangle=(|0\rangle-|1\rangle)/\sqrt{2}$ if $s_j^x(t)=-1$. Considering the x axis means the consideration of linear superposition.

The present embodiment describes the quantum entanglement, which is another quantum mechanical effect. Let us assume a two-qubit system described with $|\Psi\rangle=\alpha|00\rangle+\beta|11\rangle$, for example. $|\alpha|^2+|\beta|^2=1$ is satisfied due to a normalization condition. The first variable of $|00\rangle$ and $|11\rangle$ expresses the first qubit, and the second variable thereof expresses the second qubit. Since $\hat{\sigma}_j^z|0\rangle=|0\rangle$ and $\hat{\sigma}_j^z|1\rangle=-|1\rangle$ are satisfied according to the properties of the Pauli spin matrix, $\hat{\sigma}_1^z|\Psi\rangle=\alpha|00\rangle-\beta|11\rangle$ is obtained, and thus $\langle\Psi|\hat{\sigma}_1^z|\Psi\rangle=|\alpha|^2-|\beta|^2$. In addition, since $\hat{\sigma}_1^x|0\rangle=|1\rangle$ and $\hat{\sigma}_1^x|1\rangle=|0\rangle$ are satisfied, $\hat{\sigma}_1^x|\Psi\rangle=\alpha|10\rangle+\beta|01\rangle$ is obtained, and thus $\langle\Psi|\hat{\sigma}_1^x|\Psi\rangle=0$. Furthermore, since $\hat{\sigma}_1^y|0\rangle=i|1\rangle$ and $\hat{\sigma}_1^y|1\rangle=-i|0\rangle$ are satisfied, $\hat{\sigma}_1^y|\Psi\rangle=i\alpha|10\rangle-i\beta|01\rangle$ is obtained, and thus $\langle\Psi|\hat{\sigma}_1^y|\Psi\rangle=0$. Thus, $\langle\hat{\sigma}_1^x(\tau)\rangle^2+\langle\hat{\sigma}_1^y(\tau)\rangle^2+\langle\hat{\sigma}_1^z(\tau)\rangle^2=(|\alpha|^2-|\beta|^2)^2$ is obtained. When $\alpha=\beta$ that is an extreme example, the quantum entanglement is maximum, $\langle\hat{\sigma}_1^x(\tau)\rangle^2+\langle\hat{\sigma}_1^y(\tau)\rangle^2+\langle\hat{\sigma}_1^z(\tau)\rangle^2=0$ is obtained, and the magnitude of the first spin vector is 0. This does not occur if there is no quantum entanglement. Let us assume a one-spin system. A state is described by $|\Psi\rangle=\alpha|0\rangle+\beta|1\rangle$. Since $\langle\Psi|\hat{\sigma}_1^z|\Psi\rangle=|\alpha|^2-|\beta|^2$, $\langle\Psi|\hat{\sigma}_1^x|\Psi\rangle=\alpha^*\beta+\alpha\beta^*$, and $\langle\Psi|\hat{\sigma}_1^y|\Psi\rangle=i\alpha\beta^*-i\alpha^*\beta$, $\langle\hat{\sigma}_1^x(\tau)\rangle^2+\langle\hat{\sigma}_1^y(\tau)\rangle^2+\langle\hat{\sigma}_1^z(\tau)\rangle^2=(|\alpha|^2+|\beta|^2)^2=1$ is obtained, and the magnitude is surely maintained to be 1.

The above example showed that the magnitude of a spin vector is not maintained to be 1 if quantum entanglement exists, although just one example only is presented. The magnitude of a spin vector should classically be constant of 1, but it is not 1 if quantum entanglement exists. In the first embodiment, the magnitude of a spin vector was corrected to be 1 using $\theta$ of $\tan\theta=\langle B_j^z(t)\rangle/\langle B_j^x(t)\rangle$, which was consistent with a classical algorithm. However, in exchange of satisfying the classical condition that the magnitude of a spin vector is conserved, this method does not reflect the property of quantum entanglement that this system inherently has. Therefore, let us consider a method that partly reflects the property of quantum entanglement.

As described above, a spin vector does not maintain its magnitude to be 1. For this reason, let us define a correction parameter $r_s$ ($0 \le r_s \le 1$) expressing the magnitude of a spin. Next let us note that the proportional relation of Eq. (8) is not satisfied when a spin vector does not maintain its magnitude to be 1. To take this fact in, let us define a correction parameter $r_B$ and rewrite Eq. (8) into Eq. (11).

$$s_j^z(t_k)/s_j^x(t_k)=r_B B_j^z(t_k)/B_j^x(t_k) \quad [\text{Eq. 11}]$$

As similar to the first embodiment, let angle $\theta$ be the direction of a spin, i.e., $\tan\theta=s_j^z(t_k)/s_j^x(t_k)$. From this and Eq. (11), $\tan\theta=r_B \cdot B_j^z(t_k)/B_j^x(t_k)$. Since the magnitude of a spin is $r_s$, $s_j^z(t_k)=r_s\sin\theta$ and $s_j^x(t_k)=r_s\cos\theta$ are obtained. The effect of quantum entanglement is thus taken into the classical algorithm through the correction parameters $r_s$ and $r_B$ in accordance with these relational equations. The expression for $f_1$ is $f_1(B_j^z(t_k),B_j^x(t_k))=r_s\sin(\arctan(r_B\cdot B_j^z(t_k)/B_j^x(t_k)))$.

The short summary of the above part is that the correction parameters $r_s$ and $r_B$ are added, $\theta$ is defined by $\tan\theta=r_B\cdot B_j^z(t_k)/\gamma$ or $\tan\theta=r_B\cdot B_j^z(t_k)/\{\gamma(1-t_k/t_m)\}$, and this $\theta$ is used to determine $s_j(t_k)$ by $s_j(t_k)=r_s\sin\theta$. The function f is $f(B_j^z(t_k))=r_s\sin(\arctan(r_B\cdot B_j^z(t_k)/\gamma))$ or $f(B_j^z(t_k), t_k)=r_s\sin(\arctan(r_B\cdot B_j^z(t_k)/\{\gamma(1-t_k/t_m)\}))$.

These correction parameters $r_s$ and $r_B$ originate from quantum entanglement, and are preferably controlled finely depending on $t_k$, $s_j^z(t_k)$, and $s_j^x(t_k)$. In actual computation, however, information about quantum entanglement for accurate control is not sufficiently known. This is difficult in principle, and therefore some ways of coping need to be considered. The simplest method is to use constants for the correction parameters $r_s$ and $r_B$. When constants are used, the corrections should be slight, typically $r_s$=about 0.9 and $r_B$=about 0.9 as indication although the magnitude is to be determined empirically. However, since the optimum values of the correction parameters $r_s$ and $r_B$ are dependent on the ranges and the distributions of the values of $J_{ij}$ and local field $g_j$, the correction parameters $r_s$ and $r_B$ are preferably determined after $J_{ij}$ and local field $g_j$ are determined. While the aforementioned indication of $r_s$=about 0.9 and $r_B$=about 0.9 were not larger than 1, the optimum values of correction parameters $r_s$ and $r_B$ may be 1 or larger depending on the ranges and the distributions of the values of $J_{ij}$ and local field $g_j$. Furthermore, although it is preferable to use both parameters for finely controlling the computation, even if one of the parameters is fixed to be 1 and only the other parameter is used for simplification of the computation, an advantageous effect exists.

A computation process starts with $s_j^x=1$ and ends with $s_j^z=\pm 1$. Thus, quantum entanglement does not appear at the start and at the end. Quantum entanglement occurs at the intermediate stage of the computation. To take this property reflected, it is effective to set $r_s=1$ and $r_B=1$ at the start and at the end of the computation, to make both $r_s$ and $r_B$ gradually smaller (larger) as the computation progresses, thereafter to make $r_s$ and $r_B$ gradually larger (smaller) in reverse, and finally to return to $r_s=1$ and $r_B=1$.

If there are no special characteristics between sites, the correction parameters $r_s$ and $r_B$ should not be site-dependent; if the characteristics of respective sites are known in advance, it is effective to make the correction parameters $r_s$ and $r_B$ site-dependent, accordingly.

FIG. 3 illustrates a flowchart for the case of $r_s$ and $r_B$ being introduced. The difference from the flowchart in FIG. 2 is steps 103, 105, and 107 are respectively replaced with steps 110, 111, and 112 that include the correction parameters $r_s$ and $r_B$.

Third Embodiment

As seen in the above-described Eq. (2), etc., the computation time is assumed to be $\tau$. However, there are some methods of determining a final solution. The third embodiment describes various methods for determining the solution.

Figure 4A:
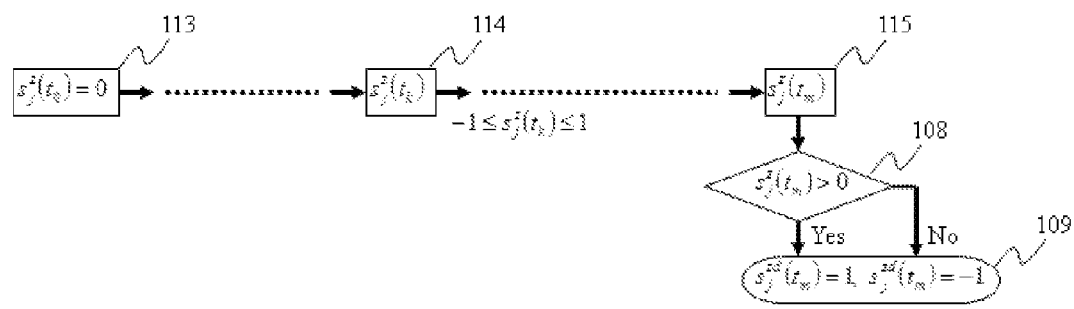
FIG. 4A illustrates an example of a flowchart relating to how to determine the final solution of an algorithm according to the third embodiment.

The first method is illustrated in FIG. 4A. If $s_j^z>0$ at $t=\tau$ ($t=t_m$)(115), $s_j^{zd}=1$; and if $s_j^z<0$, $s_j^{zd}=-1$. The flowcharts of the embodiments described in FIGS. 2 and 3 correspond to this case, and FIG. 4A illustrates a flowchart focusing only on how to determine the solution.

Figure 4B:
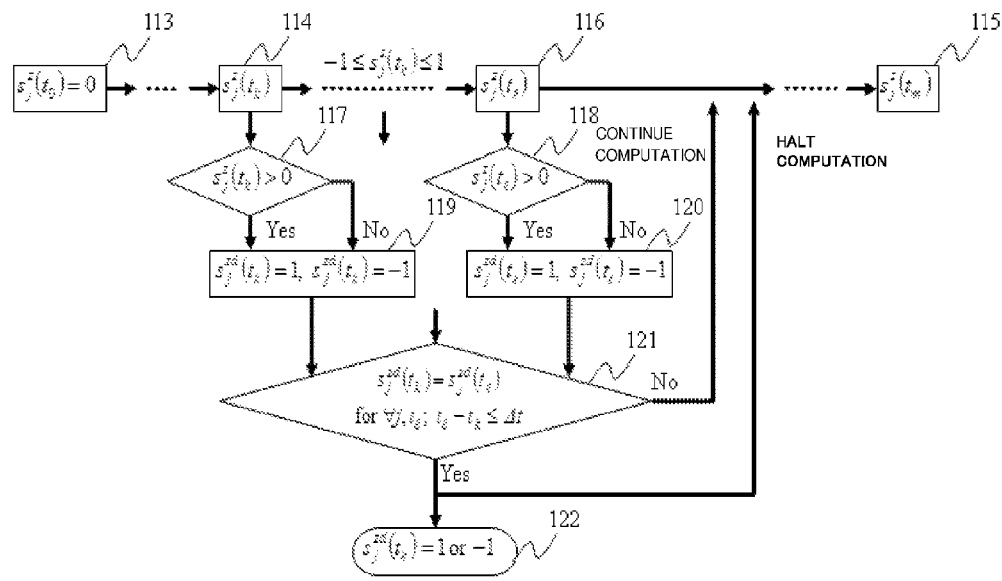
FIG. 4B illustrates another example of a flowchart relating to how to determine the final solution in the third embodiment.

The second method is illustrated in FIG. 4B. The convergence of $s_j^z$ is checked, and if the sign of $s_j^z$ has not changed at all times $t_L$ during a sufficient period $\Delta t$ after certain time $t_k$ (121), $s_j^{zd}=1$ or $-1$ is determined on the basis of the sign of $s_j^z$ at that point (122).

Figure 4C:
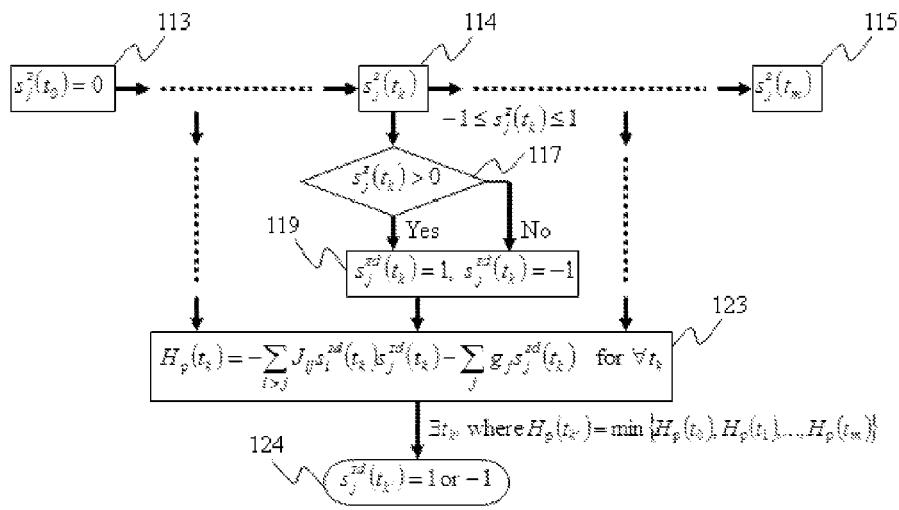
FIG. 4C illustrates another example of a flowchart relating to how to determine the final solution in the third embodiment.

The third method is illustrated in FIG. 4C. Computation is continued until $t=\tau$ ($t=t_m$) (115) as similar to the first method, but energy at each stage is calculated on the basis of Eq. (3). Since the eigenvalue of $\hat{\sigma}_j^z$ in Eq. (3) is $\pm 1$, the eigenvalue of $\hat{\sigma}_j^z$ at each stage of the computation process is determined to be 1 or $-1$ according to the sign of $s_j^z$. Specifically, the eigenvalue of $\hat{\sigma}_j^z$ is 1 ($s_j^{zd}=1$) if $s_j^z(t_k)>0$ and the eigenvalue of $\hat{\sigma}_j^z$ is $-1$ ($s_j^{zd}=-1$) if $s_j^z(t_k)<0$. The energy is calculated using the eigenvalue of $\hat{\sigma}_j^z$, but $s_j^z(t_k)$ ($-1 \leq s_j^z(t_k) \leq 1$) is used in the computation process. The energies at respective times $t_k$ are compared with each other when time reaches $t=\tau$ ($t=t_m$). If the lowest energy is obtained at time $t_{k'}$, a final solution is determined in accordance with the sign of $s_j^z(t_{k'})$.

Specifically, if $s_j(t_k) < 0$ at each of times $t_k$, $s_j^{zd}(t_k) = -1$, and if $s_j(t_k) > 0$, $s_j^{zd}(t_k) = 1$ (119); $H(t_k) = -\Sigma_{i>j} J_{ij} s_i^{zd}(t_k) s_j^{zd}(t_k) - \Sigma_j g_j s_j^{zd}(t_k)$ is calculated at each time $t_k$ (123); and if $H(t_k)$ is minimum at time $t_{k'}$, a final solution is $s_j^{zd}(t_{k'})$ (124).

Figure 4D:
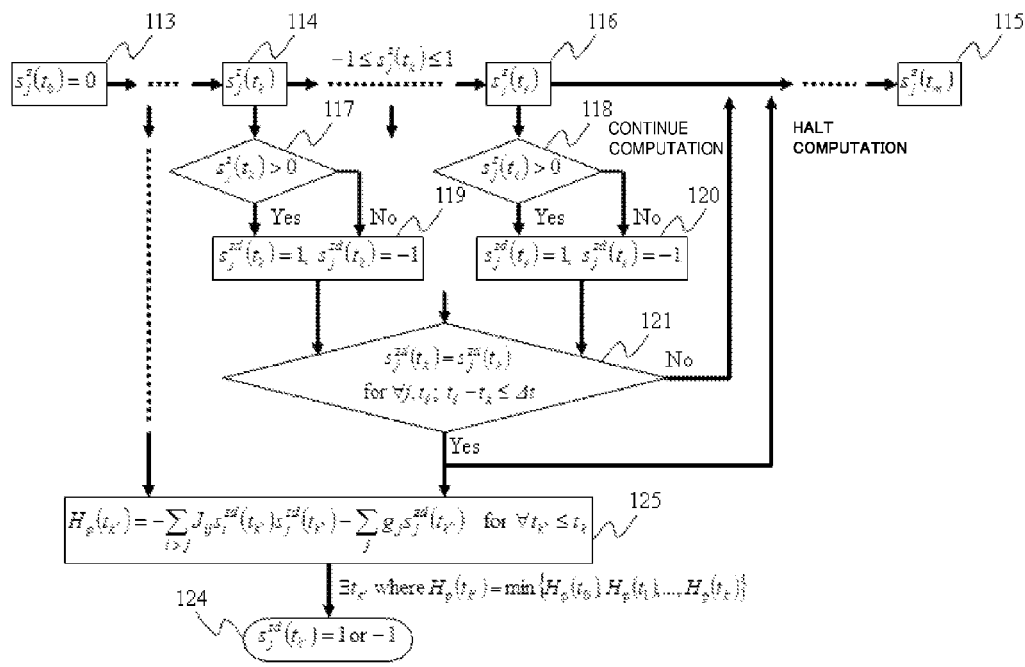
FIG. 4D illustrates another example of a flowchart relating to how to determine the final solution in the third embodiment.

The fourth method is illustrated in FIG. 4D. computation is terminated at a stage when all $s_j^z$ have converged similarly to the second method. A final solution, however, is not determined from $s_j^z$ at the point of termination, but energies at respective times are calculated similarly to the third method and a final solution is determined from $s_j^z(t_{k'})$ at time $t_{k'}$ when the lowest energy is given (125). A user may determine which method is employed.

Fourth Embodiment

As seen in FIG. 1, computation is executed using a discrete time axis in the present invention. According to the principle of the quasistatic process, shorter discrete-time intervals are better. If the time intervals are too short, however, the computation time will be longer. Thus, the time intervals may be changed with the progress of computation. Important time in a computation process is the point when the sign of $s_j^z$ changes. Thus, there is no problem in setting the time intervals longer around the start and the end of computation when the sign rarely changes. Therefore, the first method sets the time interval relatively long at the start of computation in a programmatic manner, sets it shorter with time, and thereafter sets it longer in reverse. In the second method, computation is first started with relatively long time interval, the time interval is made shorter at the time point when the sign of one of any spins $s_j^z$ has changed, and the time interval is further made shorter when the sign of another spin is inverted. That is repeated. In this case, if inversion of spins does not go on during a sufficient time period, the time interval is gradually made longer. In a third method, computation is first started with relatively long time interval, the time interval is made shorter at a time point when the magnitude of one of any spins $|s_j^z|$ has become sufficiently smaller than that of the other spins, and the time interval is returned to a larger value at a time point when $|s_j^z|$ has become relatively large. This is repeated.

Fifth Embodiment

If solutions are not degenerated and the ground state is unique, computation is possible using the methods described in the first to fourth embodiments. However, the number of solutions is not limited to one, but there may be two or more solutions. This is a degenerate case. There is also a quasi-degenerate case where energy states are not precisely degenerated but energy values are almost equal. In such a case, a solution may vary depending on an initial value. For that case, there is a method of starting computation with an appropriate value of $s_j^z \neq 0$ as the initial value instead of setting the initial value to $s_j^z = 0$ and $s_j^x = 1$. The first method sets each $s_j^z$ to be a random number. In the second method, computation is first performed with $s_j^z = 0$ as the initial value and a solution is obtained. Next, the signs of the solution are inverted, and computation is performed again using the inverted values as the initial values. The energy values of both executed results are compared, and the solution with the smaller energy is selected to be a final solution. If the energies of the both results are equal, both solutions are a final solution.

Sixth Embodiment

Figure 5:
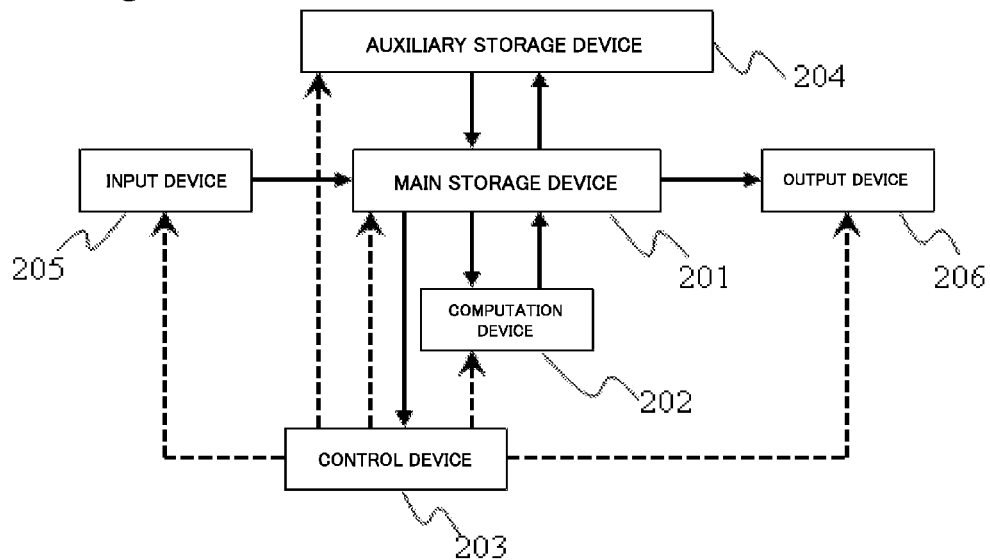
FIG. 5 is a diagram illustrating an example of a configuration of a computer according to the sixth embodiment.

In the first to fifth embodiments, the computation principle and the computation algorithms have been explained. The sixth embodiment describes an example of a configuration of a computer that performs the algorithms through executing a program. FIG. 5 illustrates an example of a configuration of a computer according to the present embodiment. The configuration of FIG. 5 is basically the same as that of an ordinary computer, in which data are transferred from a main storage device 201, which is a storage unit, to a computation device 202, which is a computing unit, and data are returned to the main storage device 201 after computation. Computation progresses by repeating this. A controller for the process is a control device 203, which is a control unit. Computation with the configuration of the present embodiment is along the flows in FIGS. 2 and 3 and is executed with the computation device 202 for each time and for each site.

Programs to be executed by the computation device 202 are stored in the main storage device 201, which is the storage unit. If the storage capacity of the main storage device 201 is not sufficient, an auxiliary storage device 204, which is also a storage unit, is used. An input device 205 is used for inputting data, programs, and the like, and an output device 206 is used for outputting results. The input device 205 involves an interface for network connections in addition to a manual input device such as a keyboard. The interface also functions as an output device. Although the configuration in FIG. 5 is used to perform the algorithms described in the first to fifth embodiments, equipment itself is an ordinary computer Since an ordinary computer digitally operates, there is no noise basically. In this sense, the system is at absolute zero.

Figure 6:
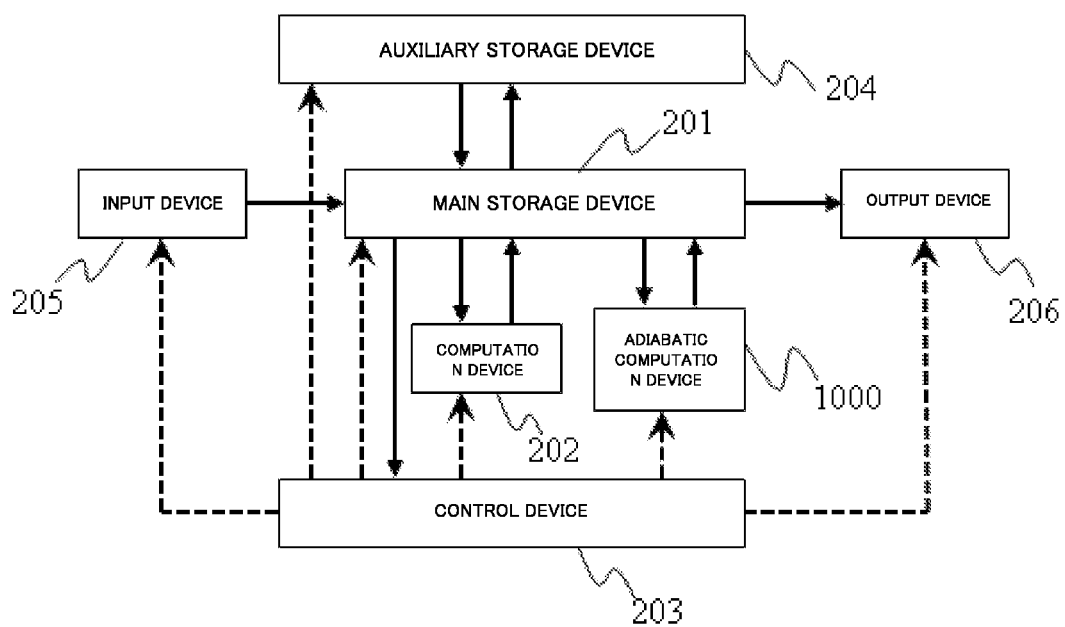
FIG. 6 is a diagram illustrating another example of a configuration of a computer according to the sixth embodiment.

In contrast, there is also a method of using the computation principle and the algorithms described in the first to fifth embodiments including the device configurations as illustrated in FIG. 6, in addition to the algorithm being performed as a program. The configuration of a computer according to the present embodiment illustrated in FIG. 6 additionally includes an adiabatic computation device 1000, which is a computing unit, compared to FIG. 5. The adiabatic computation device 1000 is a computing unit dedicated to execution of the above-described algorithm; general processing is performed with the computation device 202 while only processing related to the adiabatic computation (quasistatic computation) described in the first to fifth embodiments is performed with the adiabatic computation device 1000. Information used in the adiabatic computation device 1000 is transferred from the main storage device 201.

Necessary information includes program-setting parameters such as interaction $J_{ij}$ between variables and local field $g_j$ and also includes time parameter $t_k$, correction parameters $r_s$ and $r_B$ relating to quantum entanglement, and the like. Processing such as synchronization is played by the control device 203 as similar to the computer of the configuration in FIG. 5. If necessary, not only a final result but also information on an intermediate stage are transferred at each parameter $t_k$ from the adiabatic computation device 1000 to the main storage device 201 according to instructions from the control device 203. Values transferred from the adiabatic computation device 1000 at intermediate stages of computation are used to calculate the energy of the Ising spin Hamiltonian at the stages, for example.

These energy values are used for determining a final solution in the third and fourth methods explained in the third embodiment, as illustrated in FIGS. 4C and 4D. Because calculating the energy of the Ising spin Hamiltonian is simple due to $s_j^{zd}=+1$ or $-1$, the ordinary computation device 202 is used therefor. The adiabatic computation device 1000 is a computing unit dedicated to the above-described adiabatic (quasistatic) process, and the ordinary computation device 202 is used for other processes.

Seventh Embodiment

The adiabatic computation device 1000 described in the sixth embodiment is used as an accelerator and can be implemented with an electric circuit, or can also be implemented with an optical system using the phase of light for $s_j^z$. The present embodiment relates to an embodiment of an adiabatic computation device implemented with an optical system.

Figure 7:
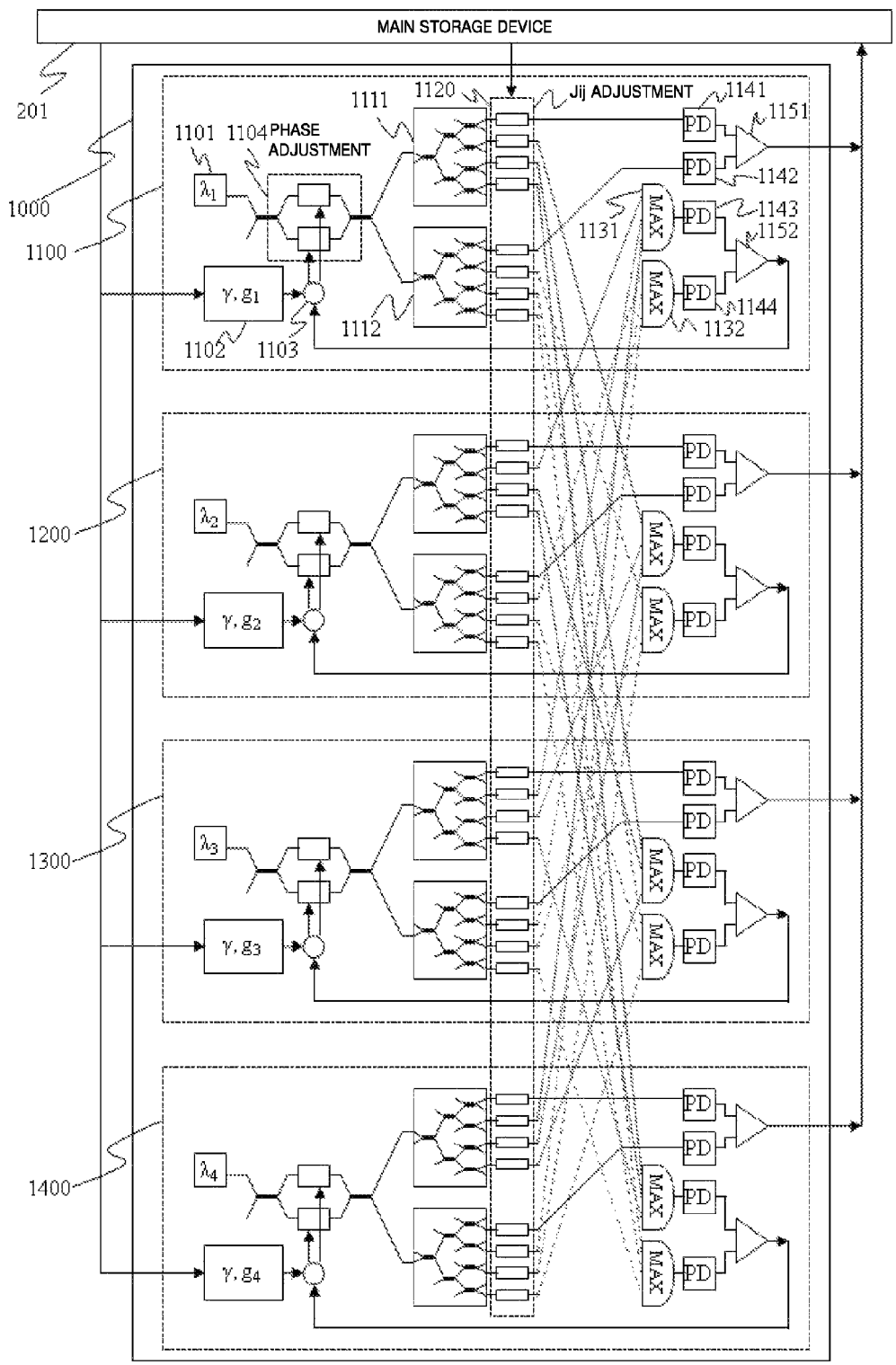
FIG. 7 is a diagram illustrating an example of a configuration of an adiabatic computation device included in a computer according to the seventh embodiment.

FIG. 7 illustrates a configuration of an adiabatic computation device implemented with an optical system, where the number of bits is four, and each of computation blocks 1100, 1200, 1300, and 1400 constitutes one bit. The computation block 1100 is represented by a bit 1, and the operation of each bit is explained using this bit as an example. Light emitted from a laser source 1101 is phase-modulated in a Mach-Zehnder interferometer 1104 incorporating phase modulators, and then guided to dividers 1111 and 1112. Let light intensities divided into the dividers 1111 and 1112 be $I_{11}$ and $I_{12}$, respectively. A spin with $-1 \le s_1^z \le 1$ is expressed as $s_1^z=(I_{11}-I_{12})/(I_{11}+I_{12})$. The division ratio of $I_{11}$ and $I_{12}$ is adjusted with the modulator 1104. The modulator 1104 is constituted of two phase modulators. When the modulation amount of one phase modulator is $\delta\theta$, that of the other phase modulator is $-\delta\theta$. Thus, the modulations are balanced between two optical paths. The total amount of modulation is $2\delta\theta$. A signal for modulation is output from a signal source 1102. At $t=t_0$, the effective magnetic field is only an external field $\gamma$, and $s_1^z=0$, where phase modulation is performed such that $I_{11}=I_{12}$. The optical signal is divided with dividers 1111 and 1112, and one of signals divided with dividers 1111 and 1112 is respectively guided to photodetectors 1141 and 1142, and is detected there. The detected signals are transformed into a difference signal with a differential amplifier 1151, which becomes a spin output at $t=t_0$. The other divided signals from the dividers 1111 and 1112 are guided to other bits 1200, 1300, and 1400 to interact with other spins. In this process, the light intensity is adjusted by a gain controller 1120 according to the value of the interaction $J_{ij}$ between variables.

Signals of other bits are also input to the bit of the computation block 1100. Those are due to the interaction $J_{ij}$ between variables. Those signal lights from all the bits for the interaction are multiplexed with multiplexers 1131 and 1132, are detected by photodetectors 1143 and 1144, and are transformed into a difference signal by a differential amplifier 1152. The reason why the difference is taken is because an interaction signal from another bit is $s_j^z=(I_{j1}-I_{j2})/(I_{j1}+I_{j2})$. Here, the bits have different wavelengths from one another; let oscillation frequencies of any two laser sources be $f_i$ and $f_j$; and let the clock frequency of computation be $f_r$; then those frequencies are adjusted to satisfy $f_r \ll f_j-f_i$. This condition is to make negligible the interference effect in multiplexing lights at the multiplexers 1131 and 1132. A signal output from the differential amplifier 1152 is added to a signal from the signal source 1102 with an adder 1103, and is guided to the modulator 1104 as a signal $B_1^z(t_k)$ that is the z component of the effective magnetic field. As a result, time is shifted from time $t=t_0$ to time $t=t_1$. This process is repeated up to $t=t_m$.

In the adiabatic computation device of the present embodiment, an input to the modulator 1104 corresponds to the z component $B_1^z(t_k)$ of the effective magnetic field, and an output from the differential amplifier 1151 corresponds to $s_1^z(t_k)$. Factors $t_{k+1}$ and $J_{ij}$ in the first term of Eq. (10) and correction parameters $r_s$ and $r_B$ are adjusted in the gain controller 1120. Factor $t_{k+1}$ in the second term of Eq. (10) is adjusted in the signal source 1102.

$s_1^z(t_k)$ at each time $t_k$ is output to the main storage device 201 and used for analysis based on the algorithm. Those are the principle of the operation in the adiabatic computation device 1000 utilizing the phase of light. The other ordinary computations are executed through communication of data between the main storage device 201 and the computation device 202.

The influence of temperature in the present embodiment is estimated as follows. A bit is controlled with the modulator 1104. Voltage is applied to the modulator 1104 by 3 V to invert a bit, for example. Let e be the elementary charge and let $k_B$ be the Boltzmann constant. The temperature corresponding to the voltage is $T=3.5\times10^4$ K due to $T=eV/k_B$. This value is sufficiently higher than room temperature of 300 K, and therefore, temperature in such an optical system as described in the present embodiment is absolute zero in a pseudo manner.

Note that the present invention is not limited to the embodiments described above, but includes various modifications. For example, the embodiments are not necessarily limited to those including all the features described above, because the embodiments described above were described in detail for better understanding of the present invention. Furthermore, some of features of an embodiment may be replaced with features of another embodiment, and a feature of an embodiment may be added to features of another embodiment. Part of the features in the embodiments may be added from other features, may be deleted, or may be replaced with other features.

Furthermore, although power supply control has been described as an example of problems to which the present invention is applicable, problems to be set are not limited thereto but the present invention is applicable to a variety of problems such as travel route optimization, circuit design, product supply control, scheduling, and financial asset selection.

While the above-described examples about the configurations, functions, processing units, and the like were explained by assuming to execute programs that implement some or all thereof using computing units, it goes without saying that some or all thereof may be implemented by hardware such as integrated circuits designed therefor, for example.

Note that the description of the specification describing the embodiments discloses not only the invention described in the claims but also various inventions. Some of the inventions are listed as in the following notes.

<Notes>

1) A computation program to be executed by a computing unit, the computation program causing computation to be executed, wherein N vector variables $s_j$ (j=1, 2, ..., N, $|s_j|=1$) are used, a problem is set through setting local field $g_j$ and interaction $J_{ij}$ between variables (i, j=1, 2, ..., N), and the z component of $s_j$ is a final solution as $s_j^z=-1$ or 1, and time axis is divided into m parts and computation is performed discretely from $t=t_0$ ($t_0=0$) to $t_m$, the x component of $s_j$ has an initial value of $s_j^x(t_0)=1$, the z component thereof is $s_j^z(t_0)=0$, a value of variable $s_j^z(t_k)$ at each time $t_k$ is determined using $B_j^x(t_k)=\gamma(1-t_k/t_m)$ and $B_j^z(t_k)=(\Sigma_i J_{ij} s_i^z(t_{k-1})+g_j)t_k/t_m$ or using $B_j^x(t_k)=\gamma$ and $B_j^z(t_k)=(\Sigma_i J_{ij} s_i^z(t_{k-1})+g_j)t_k/t_m$, $\gamma$ being a constant, functions $f_1$ and $f_2$ are defined to give $s_j^z(t_k)=f_1(B_j^x(t_k), B_j^z(t_k))$, $s_j^x(t_k)=f_2(B_j^x(t_k), B_j^z(t_k))$ so that vector variable $s_j(t_k)$ satisfies $|s_j(t_k)|=1$, $s_j^z$ is made closer to −1 or 1 as a time step is taken forward from $t=t_0$ to $t=t_m$, and finally $s_j^z=-1$ is determined as a solution if $s_j^z<0$ and $s_j^z=1$ is determined as the solution if $s_j^z>0$.

2) The computation program according the above 1), wherein a correction parameter $r_s$ is added, and the functions $f_1$ and $f_2$ are defined so that the vector variable $s_j(t_k)$ satisfies $|s_j(t_k)|=r_s$.

3) The computation program according to the above 2), wherein the correction parameter $r_s$ is dependent on $t_k$, $B_j^z(t_k)$, and $B_j^x(t_k)$.

4) The computation program according to the above 1), wherein $s_j^{zd}(t_k)=-1$ is determined if $s_j^z(t_k)<0$ and $s_j^{zd}(t_k)=1$ is determined if $s_j^z(t_k)>0$ at each time $t_k$, $H(t_k)=-\Sigma_{i>j} J_{ij} s_i^{zd}(t_k) s_j^{zd}(t_k) - \Sigma_j g_j s_j^{zd}(t_k)$ is calculated at each time $t_k$, and when $H(t_k)$ is minimum at time $t_k$, $s_j^{zd}(t_k)$ is determined to be a final solution.

5) A computer comprising: a computing unit; a storage unit; and a control unit, the computer being configured to perform computation while exchanging data between the storage unit and the computing unit under control of the control unit, wherein N vector variables $s_j$ ($j=1, 2, \ldots, N$, $|s_j|=1$) are used, a problem is set through setting local field $g_j$ and interaction $J_{ij}$ between variables ($i, j=1, 2, \ldots, N$), and the z component of $s_j$ is a final solution as $s_j^z=-1$ or 1, time axis is divided into m parts and computation is performed discretely from $t=t_0$ ($t_0=0$) to $t_m$, the x component of $s_j$ has an initial value of $s_j^x(t_0)=1$, the z component thereof is $s_j^z(t_0)=0$, a value of variable $s_j^z(t_k)$ at each time $t_k$ is determined using $B_j^x(t_k)=\gamma(1-t_k/t_m)$ and $B_j^z(t_k)=(\Sigma_i J_{ij} s_i^z(t_{k-1})+g_j)t_k/t_m$ or using $B_j^x(t_k)=\gamma$ and $B_j^z(t_k)=(\Sigma_i J_{ij} s_i^z(t_{k-1})+g_j)t_k/t_m$, $\gamma$ being a constant, functions $f_1$ and $f_2$ are defined to give $s_j^z(t_k)=f_1(B_j^x(t_k), B_j^z(t_k))$, $s_j^x(t_k)=f_2(B_j^x(t_k), B_j^z(t_k))$ so that vector variable $s_j(t_k)$ satisfies $|s_j(t_k)|=1$, $s_j^z$ is made closer to −1 or 1 as a time step is taken forward from $t=t_0$ to $t=t_m$, and finally $s_j^{zd}=-1$ is determined as a solution if $s_j^z<0$ and $s_j^{zd}=1$ is determined as the solution if $s_j^z>0$, and the computing unit includes an adiabatic computation device, and the adiabatic computation device executes computation for obtaining a value of vector variable $s_j^z(t_k)$ at each time $t_k$.

6) A computer comprising: a computing unit; a storage unit; and a control unit, the computer being configured to perform computation while exchanging data between the storage unit and the computing unit under control of the control unit, wherein N variables $s_j$ ($j=1, 2, \ldots, N$) have a range of $-1 \leq s_j \leq 1$, a problem is set through setting local field $g_j$ and interaction $J_{ij}$ between variables ($i, j=1, 2, \ldots, N$), and $s_j=-1$ or 1 is a final solution, time axis is divided into m parts and computation is performed discretely from $t=t_0$ ($t_0=0$) to $t_m$, an initial value is set to $s_j(t_0)=0$ at $t=t_0$ and a value of variable $s_j(t_k)$ at each time $t_k$ is determined using $B_j(t_k)=(\Sigma_i J_{ij} s_i(t_{k-1})+g_j)t_k/t_m$, and a function f is defined to give $s_j(t_k)=f(B_j(t_k), t_k)$ so that $s_j(t_k)$ has a range of $-1 \leq s_j(t_k) \leq 1$, $s_j$ is made closer to −1 or 1 as a time step is taken forward from $t=t_0$ to $t=t_m$, and finally $s_j=-1$ is determined as a solution if $s_j<0$ and $s_j=1$ is determined as the solution if $s_j>0$, and the computing unit includes an adiabatic computation device, the adiabatic computation device executes computation for obtaining a value of variable $s_j(t_k)$ at each time $t_k$, and the adiabatic computation device uses a phase of laser light as variable $s_j(t_k)$.

7) A computer according to the above 6), wherein the adiabatic computation device includes N computation blocks corresponding to $s_j(t_k)$ ($j=1, 2, \ldots, N$), and each of the computation blocks includes a laser source and a modulator configured to perform phase modulation on laser light output from the laser source on the basis of $B_j(t_k)$.

REFERENCE SIGNS LIST

100 procedure
201 main storage device
202 computation device
203 control device
204 auxiliary storage device
205 input device
206 output device
1000 adiabatic computation device
1100, 1200, 1300, 1400 computation block
1101 laser source
1102 signal source
1103 adder
1104 modulator
1111, 1112 divider
1120 gain controller
1131, 1132 multiplexer
1141, 1142, 1143, 1144 photodetector
1151, 1152 differential amplifier

The invention claimed is:

1. A computer which performs discrete computation to solve a problem, the computer comprising:
   a control unit;
   a computing unit configured to execute the discrete computation using an effective field equation $B_j(t_k)=(\Sigma_i J_{ij} s_i(t_{k-1})+g_j)t_k/t_m$ ($k=0, 1, \ldots m$) and ($i, j=1, 2, \ldots, N$); and
   a storage unit connected to the computing unit and which stores values of the discrete computation,
   wherein the discrete computation is performed while exchanging data between the storage unit and the computing unit under control of the control unit,
   wherein:
   a plurality of variables have a range of $-1 \leq s_j \leq 1$,
   the problem is specified by setting a plurality of local field variables $g_j$ and a plurality of interaction variables $J_{ij}$,
   the computing unit is further configured to execute the discrete computation from $t=t_0$ ($k=0$) to $t_m$ ($k=m$), and initial values of $s_j$ are set in the storage unit to $s_j(t_0)=0$ at $t=t_0$ and values of $s_j(t_k)$ at each time $t_k$ are determined using the effective field equation $B_j(t_k)=(\Sigma_i J_{ij} s_i(t_{k-1})+g_j)t_k/t_m$ and a function f defined to give $s_j(t_k)=f(B_j(t_k), t_k)$ so that $s_j(t_k)$ has a range of $-1 \leq s_j(t_k) \leq 1$, and
   $s_j$ is made closer to −1 or 1 as a time step is taken forward from $t=t_0$ to $t=t_m$, and $s_j=-1$ is determined as a final solution to the problem if $s_j<0$ and $s_j=1$ is determined as the final solution to the problem if $s_j>0$.

2. The computer according to claim 1, wherein $\tan\theta=B_j(t_k)/\gamma$ or $\tan\theta=B_j(t_k)/\{\gamma(1-t_k/t_m)\}$ is defined using a proportionality constant $\gamma$ as what $B_j(t_k)$ is transformed into, $s_j(t_k)=\sin e$ is defined using $\theta$, and the function f is obtained as $f(B_j(t_k), t_k)=f(B_j(t_k))=\sin(\arctan(B_j(t_k)/\gamma))$ or $f(B_j(t_k), t_k)=\sin(\arctan(B_j(t_k)/\{\gamma(1-t_k/t_m)\}))$.

3. The computer according to claim 1, wherein the computing unit includes an adiabatic computation device, and performs the discrete computation to obtain the values of the variables $s_j(t_k)$ at each time $t_k$ using the adiabatic computation device.

4. The computer according to claim 2, wherein the function f is defined as $f(B_j(t_k))=r_s \cdot \sin(\arctan(r_B \cdot B_j(t_k)/\gamma))$ or $f(B_j(t_k), t_k)=r_s \cdot \sin(\arctan(r_B \cdot B_j(t_k)/\{\gamma(1-t_k/t_m)\}))$, and $\theta$ is defined as $\tan\theta=r_B \cdot B_j(t_k)/\gamma$ or $\tan\theta=r_B \cdot B_j(t_k)/\{\gamma(1-t_k/t_m)\}$, and the variables are defined as $s_j(t_k)=r_s \cdot \sin\theta$ using $\theta$, where $r_s$ and $r_B$ are correction parameters.

5. The computer according to claim 4, wherein the correction parameters $r_s$ and $r_B$ are dependent on $t_k$ and $B_j(t_k)$.

6. The computer according to claim 1, wherein $s_j^{zd}(t_k)=-1$ is obtained if $s_j(t_k)<0$ and $s_j^{zd}(t_k)=1$ is obtained if $s_j(t_k)>0$ at each of the times $t_k$, and the computing unit is further configured to calculate a value of a Hamiltonian $H(t_k)=-\Sigma_{i>j}J_{ij}s_i^{zd}(t_k)s_j^{zd}(t_k)-\Sigma_j g_j s_j^{zd}(t_k)$ at each time $t_k$, and when the value of $H(t_k)$ is a minimum at a time $t_k$, the values of $s_j^{zd}(t_k)$ are determined as the final solution.

7. A computer which performs discrete computation to solve a problem comprising:
a control unit;
a computing unit configured to execute the discrete computation using an effective field equations $B_j^x(t_k)=\gamma(1-t_k/t_m)$ and $B_j^z(t_k)=(\Sigma_i J_{ij}s_i^z(t_{k-1})+g_j)t_k/t_m$ or by $B_j^x(t_k)=\gamma$ and $B_j^z(t_k)=(\Sigma_i J_{ij}s_i^z(t_{k-1})+g_j)t_k/t_m$, (k=0, 1, ... m) and i, j=1, 2, ..., N); and
a storage unit connected to the computing unit and which stores values of the discrete computation,
wherein:
plurality of vector variables $s_j$ satisfy $|s_j|=1$,
the problem is specified by setting a plurality of local field variables $g_j$ and a plurality of interaction variables $J_{ij}$,
the z component of $s_j$ is a final solution of the problem and is defined as $s_j^z=-1$ or 1,
the computing unit is further configured to execute the discrete computation from $t=t_0$ (k=0) to $t_m$ (k=m), the x component of $s_j$ has initial values set in the storage unit to $s_j^x(t_0)=1$, the z component of $s_j$ has initial values set in the storage unit to $s_j^z(t_0)=0$, values of $s_j^z(t_k)$ at each time $t_k$ are determined using the effective field equations $B_j^x(t_k)=\gamma(1-t_k/t_m)$ and $B_j^z(t_k)=(\Sigma_i J_{ij}s_i^z(t_{k-1})+g_j)t_k/t_m$ or by $B_j^x(t_k)=\gamma$ and $B_j^z(t_k)=(\Sigma_i J_{ij}s_i^z(t_{k-1})+g_j)t_k/t_m$, where $\gamma$ is a constant, and functions $f_1$ and $f_2$ are defined to give $s_j^z(t_k)=f_1(B_j^x(t_k), B_j^z(t_k))$, $s_j^x(t_k)=f_2(B_j^x(t_k), B_j^z(t_k))$ so that $s_j(t_k)$ satisfies $|s_j(t_k)|=1$, and
$s_j^z$ is made closer to $-1$ or 1 as a time step is taken forward from $t=t_0$ to $t=t_m$, and $s_j^{zd}=-1$ is determined as the final solution if $s_j^z<0$ and $s_j^{zd}=1$ is determined as the final solution if $s_j^z>0$.

8. The computer according to claim 7, wherein a correction parameter $r_s$ is added, and the functions $f_1$ and $f_2$ are defined so that the vector variable $s_j(t_k)$ becomes $|s_j(t_k)|=r_s$.

9. The computer according to claim 8, wherein the correction parameter $r_s$ is dependent on $t_k$, $B_j^z(t_k)$, and $B_j^x(t_k)$.

10. The computer according to claim 7, wherein $s_j^{zd}(t_k)=-1$ is obtained if $s_j^z(t_k)<0$ and $s_j^{zd}(t_k)=1$ is obtained if $s_j^z(t_k)>0$ at each of the times $t_k$, and the computing unit is further configured to calculate a value of a Hamiltonian $H(t_k)=-\Sigma_{i>j}J_{ij}s_i^{zd}(t_k)s_j^{zd}(t_k)-\Sigma_j g_j s_j^{zd}(t_k)$ each time $t_k$, and when the value of $H(t_k)$ is a minimum at a time $t_k$, the values of $s_j^{zd}(t_k)$ is determined as the final solution.

11. A non-transitory, computer readable medium storing a computation program causing a computing unit to perform acts comprising:
executing a discrete computation to solve a problem using an effective field equation $B_j(t_k)=(\Sigma_i J_{ij}s_j(t_{k-1})+g_j)t_k/t_m$ (k=0, 1, ... m) and (i, j=1, 2, ..., N),
wherein:
a plurality of variables $s_j$ have a range of $-1 \leq s_j \leq 1$,
the problem is specified by setting a plurality of local field variables $g_j$ and a plurality of interaction variables $J_{ij}$,
the discrete computation is performed from $t=t_0$ (k=0) to $t_m$ (k=m),
initial values of $s_j$ are set to $s_j(t_0)=0$ at $t=t_0$, and values of $s_j(t_k)$ at each time $t_k$ are determined using the effective field equation $B_j(t_k)=(\Sigma_i J_{ij}s_i(t_{k-1})+g_j)t_k/t_m$, and
a function f is defined to give $s_j(t_k)=f(B_j(t_k), t_k)$ so that $s_j(t_k)$ has a range of $-1 \leq s_j(t_k) \leq 1$, and
$s_j$ is made closer to $-1$ or 1 as a time step is taken forward from $t=t_0$ to $t=t_m$, and $s_j=-1$ is determined as a final solution to the problem if $s_j<0$ and $s_j=1$ is determined as the final solution to the problem if $s_j>0$.

12. The non-transitory, computer readable medium according to claim 11, wherein the discrete computation is executed so that $\tan\theta=B_j(t_k)/\gamma$ or $\tan\theta=B_j(t_k)/\{\gamma(1-t_k/t_m)\}$ is defined using a proportionality constant $\gamma$ as what $B_j(t_k)$ is transformed into, $s_j(t_k)=\sin\theta$ is defined using $\theta$, and the function f is obtained as $f(B_j(t_k), t_k)=f(B_j(t_k))=\sin(\arctan(B_j(t_k)/\gamma))$ or $f(B_j(t_k), t_k)=\sin(\arctan(B_j(t_k)/\{\gamma(1-t_k/t_m)\}))$.

13. The non-transitory, computer readable medium according to claim 12, wherein the function f is defined as $f(B_j(t_k))=r_s \cdot \sin(\arctan(r_B \cdot B_j(t_k)/\gamma))$ or $f(B_j(t_k), t_k)=r_s \cdot \sin(\arctan(r_B \cdot B_j(t_k)/\{\gamma(1-t_k/t_m)\}))$, $\theta$ is defined by $\tan\theta=r_B \cdot B_j(t_k)/\gamma$ or $\tan\theta=r_B \cdot B_j(t_k)/\{\gamma(1-t_k/t_m)\}$, and $s_j(t_k)$ is determined by $s_j(t_k)=r_s \cdot \sin\theta$ using $\theta$, where $r_s$ and $r_B$ are correction parameters.

14. The non-transitory, computer readable medium according to claim 13, wherein the correction parameters $r_s$ and $r_B$ are dependent on $t_k$ and $B_j(t_k)$.

15. The non-transitory, computer readable medium according to claim 11, wherein $s_j^{zd}(t_k)=-1$ is determined if $s_j(t_k)<0$ and $s_j^{zd}(t_k)=1$ is determined if $s_j(t_k)>0$ at each of the times $t_k$, and a Hamiltonian $H(t_k)=-\tau_{i>j}J_{ij}s_i^{zd}(t_k)s_j^{zd}(t_k)-\Sigma_j g_j s_j^{zd}(t_k)$ is calculated at each time $t_k$, and when a value of $H(t_k)$ is a minimum at a time $t_k$, the values of $s_j^{zd}(t_k)$ are determined to be the final solution.

* * * * *